(12) United States Patent
Pille-Wolf et al.

(10) Patent No.: US 8,637,594 B2
(45) Date of Patent: Jan. 28, 2014

(54) TIRE RUBBER COMPRISING MODIFIED TALL OIL PITCH

(75) Inventors: Wolfgang Pille-Wolf, Tervuren (BE); Neil Riddle, Almere (NL); Harry Jerrold Miller, Savannah, GA (US)

(73) Assignee: Arizona Chemical Company, LLC, Jacksonville, FL (US)

( * ) Notice: Subject to any disclaimer, the term of this patent is extended or adjusted under 35 U.S.C. 154(b) by 57 days.

(21) Appl. No.: 13/087,047

(22) Filed: Apr. 14, 2011

(65) Prior Publication Data

US 2011/0297285 A1    Dec. 8, 2011

Related U.S. Application Data

(60) Provisional application No. 61/324,768, filed on Apr. 16, 2010.

(51) Int. Cl.
  *C08K 11/00*    (2006.01)

(52) U.S. Cl.
  USPC ............................................. 524/78; 530/230

(58) Field of Classification Search
  USPC .................................................... 524/270, 81
  See application file for complete search history.

(56) References Cited

U.S. PATENT DOCUMENTS

| | | |
|---|---|---|
| 2,483,797 A | 10/1949 | Van Valkenburgh |
| 2,578,955 A | 12/1951 | Van Valkenburgh |
| 2,657,147 A | 10/1953 | Van Valkenburgh |
| 2,843,643 A | 7/1958 | Gleim |
| 2,870,105 A | 1/1959 | Ridgway et al. |
| 3,157,609 A | 11/1964 | McNay et al. |
| 3,238,164 A * | 3/1966 | Speck ........................... 524/273 |
| 3,474,059 A | 10/1969 | Body |
| 3,632,855 A | 1/1972 | Halbrook et al. |
| 3,649,580 A | 3/1972 | Arlt, Jr. et al. |
| 3,873,482 A | 3/1975 | Severson et al. |
| 4,264,481 A | 4/1981 | Markvik |
| 4,272,419 A | 6/1981 | Force |
| 4,287,104 A * | 9/1981 | Dimitri et al. .................. 524/76 |
| 4,337,193 A * | 6/1982 | Szita ............................. 527/105 |
| 4,515,713 A | 5/1985 | Wideman et al. |
| 4,581,400 A | 4/1986 | Kondo |
| 4,996,258 A | 2/1991 | Wideman et al. |
| 5,504,135 A | 4/1996 | Ardrizzi et al. |
| 6,103,808 A | 8/2000 | Hashimoto |
| 6,399,697 B1 | 6/2002 | Takasaki et al. |
| 6,984,687 B2 | 1/2006 | Henning et al. |
| 7,193,004 B2 | 3/2007 | Weydert et al. |
| 2001/0023307 A1 | 9/2001 | Kaimai et al. |
| 2002/0000280 A1 | 1/2002 | Scholl |
| 2002/0045697 A1 | 4/2002 | Sohnen et al. |
| 2006/0086836 A1 | 4/2006 | Osborn |
| 2007/0082991 A1 | 4/2007 | Chassagnon et al. |

FOREIGN PATENT DOCUMENTS

| | | |
|---|---|---|
| EP | 0367979 A1 | 10/1989 |
| GB | 469350 * | 7/1937 |
| JP | 03-137141 | 6/1991 |
| JP | 2008-201933 A | 9/2008 |
| JP | 2008201933 A * | 9/2008 |

OTHER PUBLICATIONS

JP 2008-201933 A (2008), machine translation, JPO Advanced Industrial Property Network (AIPN).*
Mark et al., Ed., Chapter 14: Tire Engineering, Science and Technology of Rubber, 3d Ed., Amsterdam: Elsevier, Inc. (2005), pp. 619-622.*
JP 2008-201933 A (2008), machine translation, JPO Advanced Intellectual Property Network (AIPN).*

* cited by examiner

*Primary Examiner* — David W Wu
*Assistant Examiner* — Josephine Chang

(57) ABSTRACT

A tire rubber composition comprising a rubber compound and a processing oil, wherein the processing oil comprises a modified tall oil pitch, methods of making tires from such compositions, and tires comprising such compositions.

12 Claims, 5 Drawing Sheets

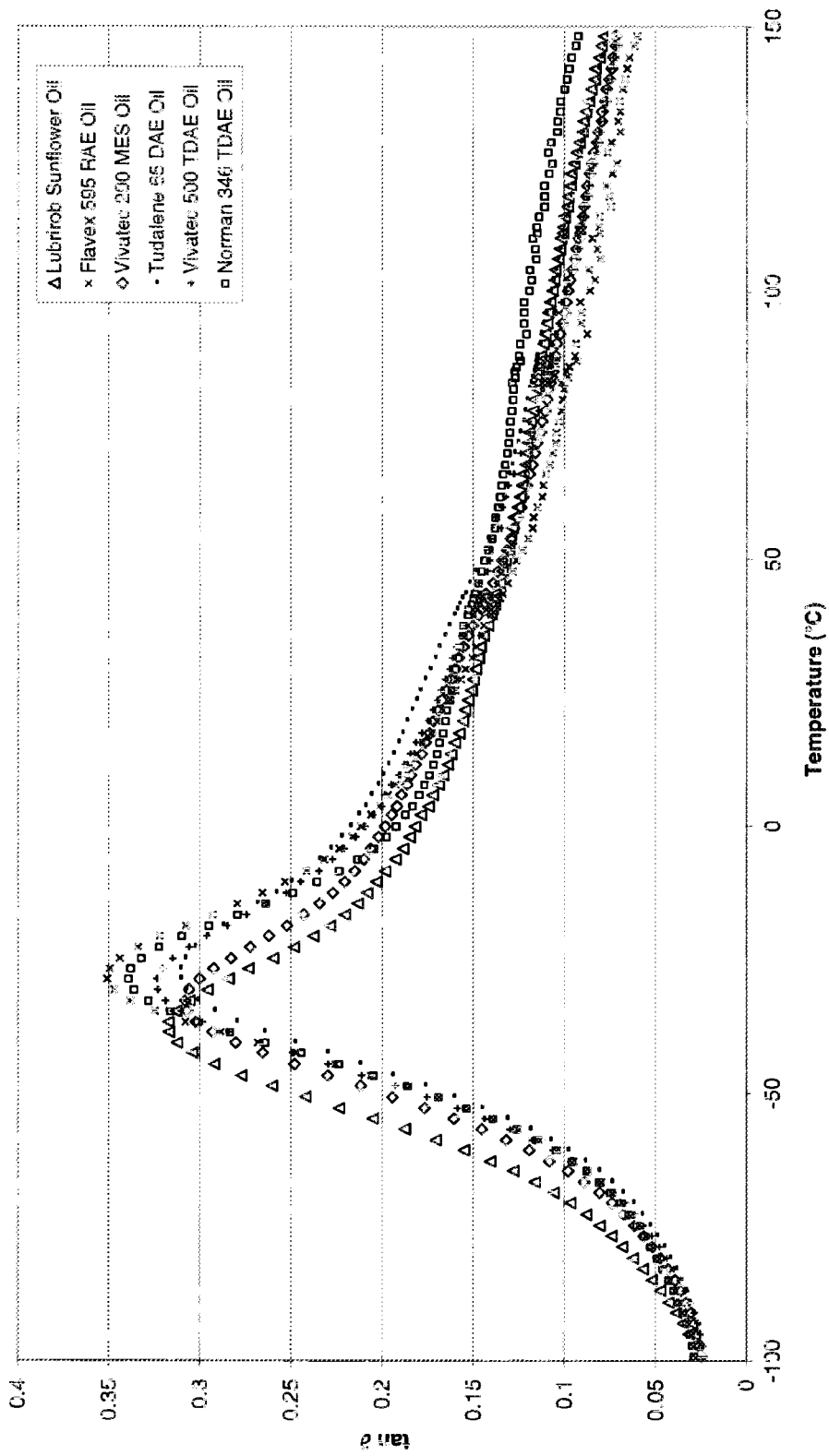

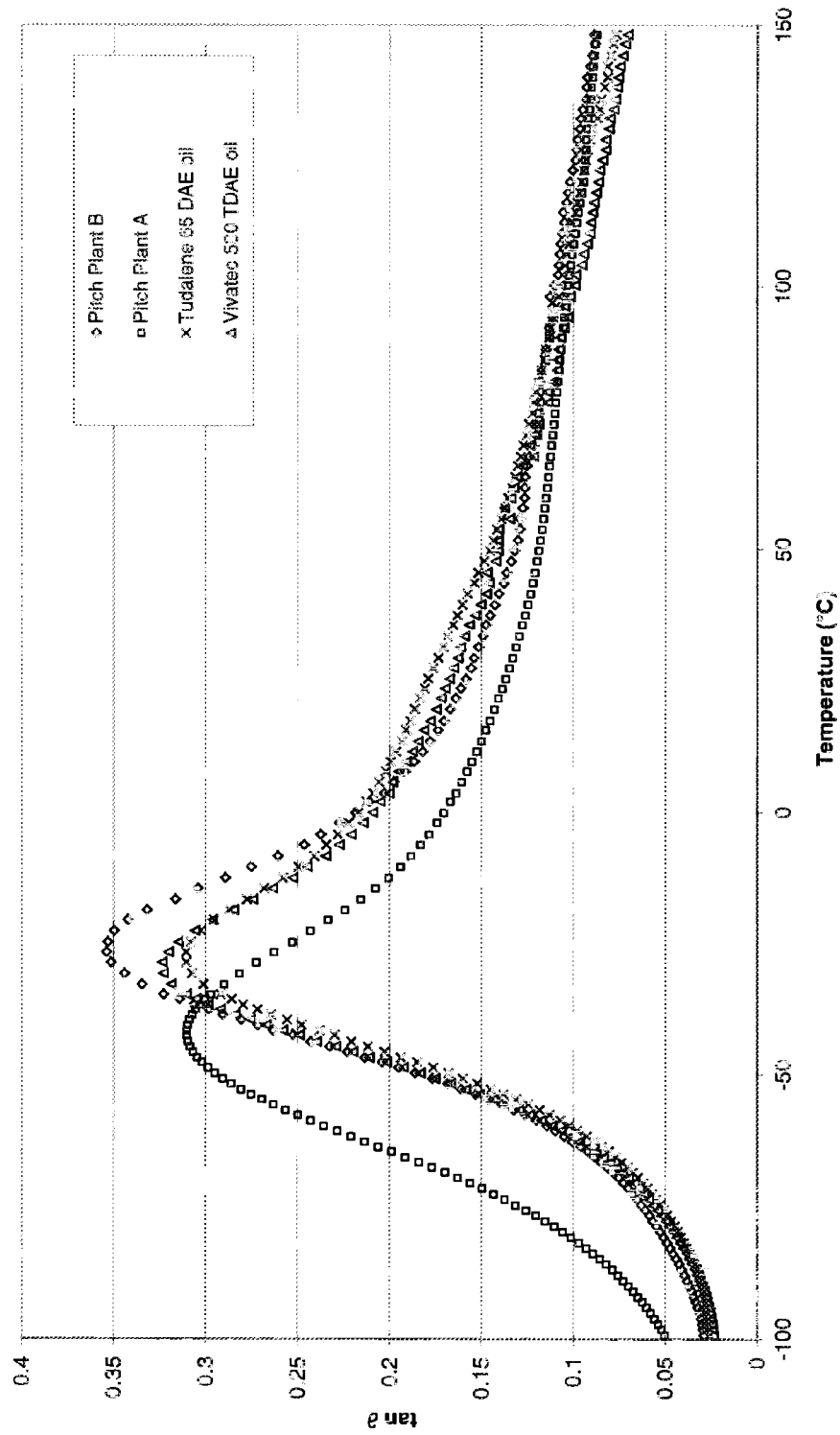

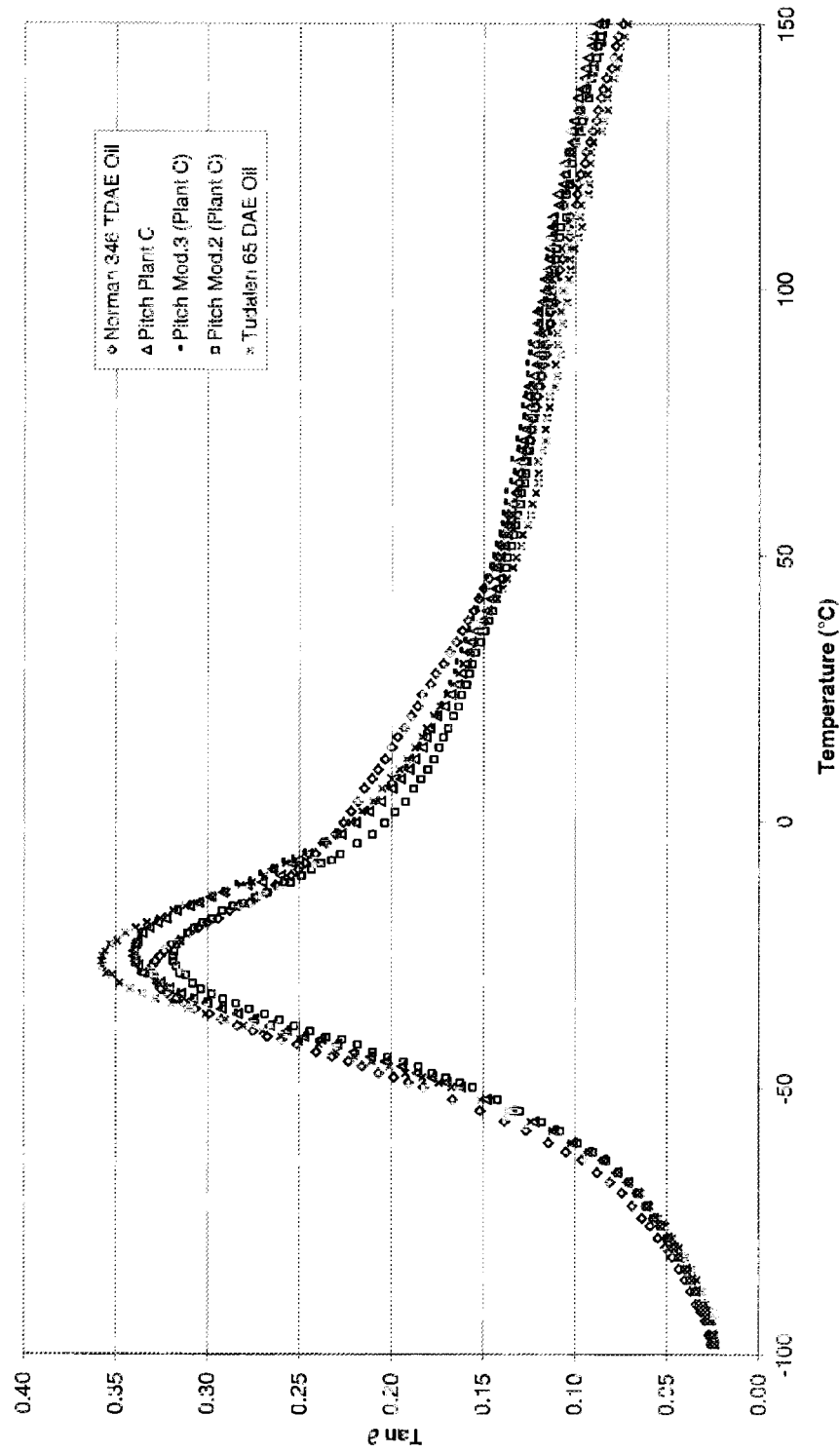

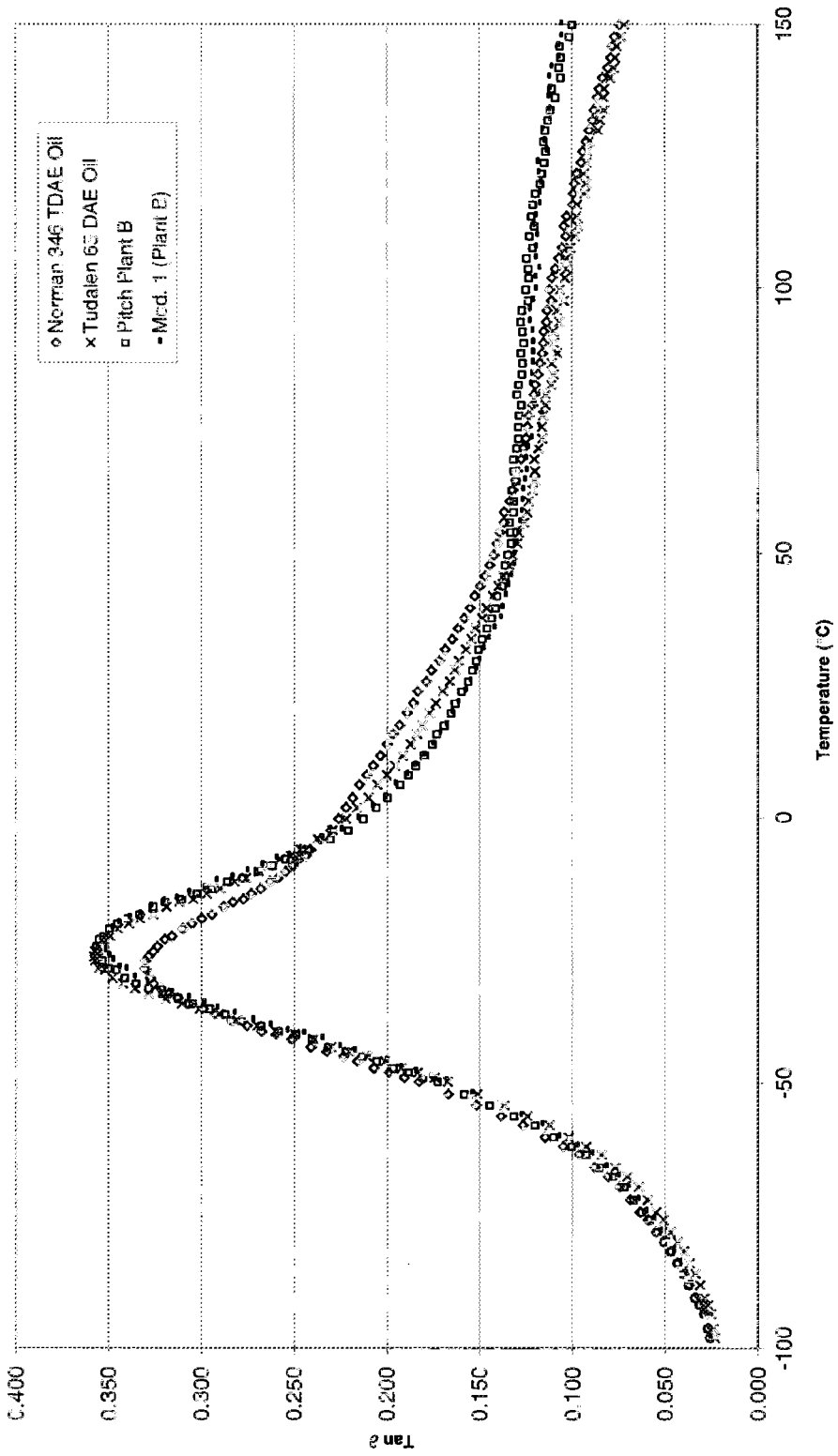

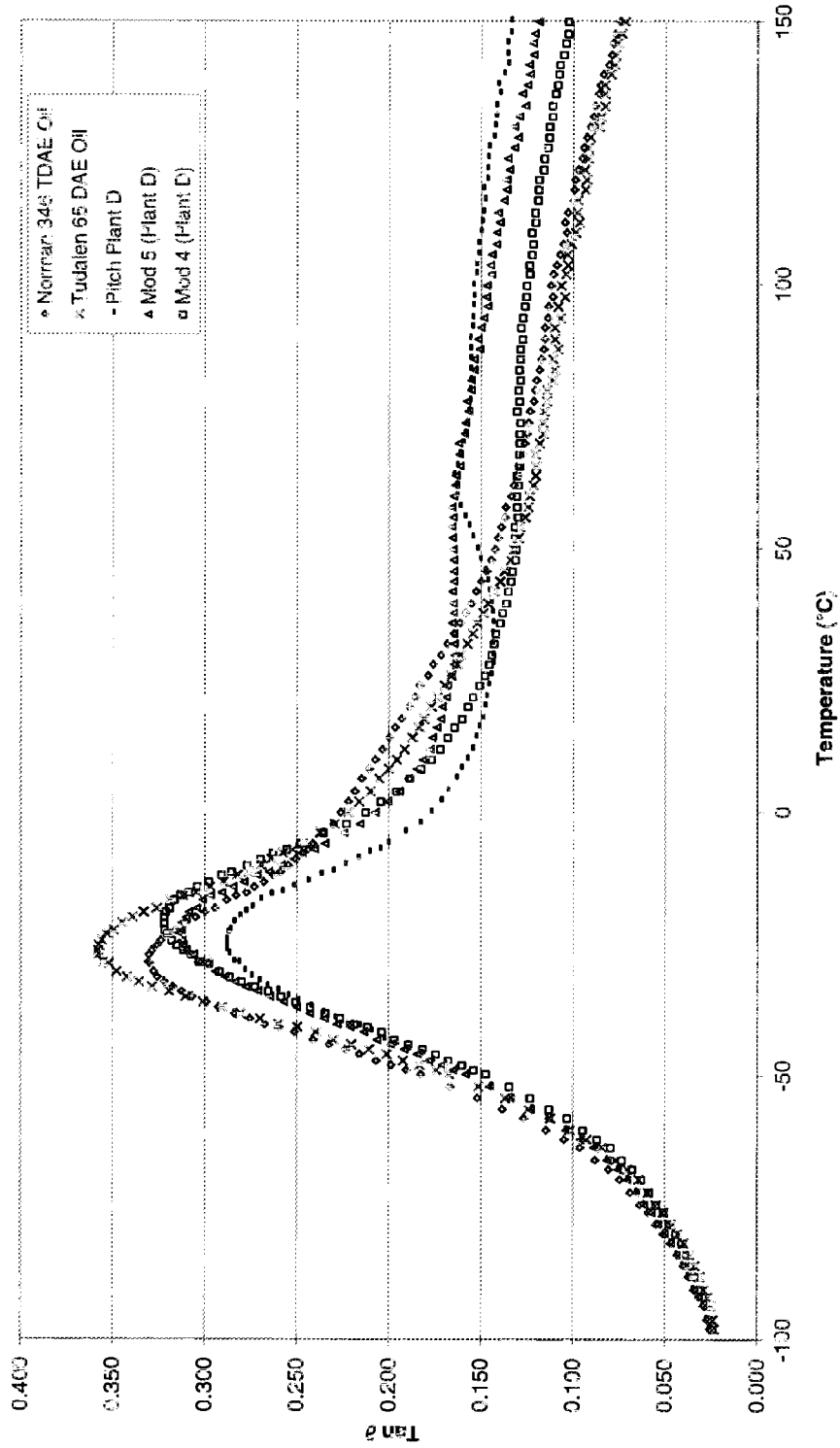

TIRE RUBBER COMPRISING MODIFIED TALL OIL PITCH

BACKGROUND OF THE INVENTION

Rubber formulations used in various tire components previously have been designed using conventional processing oils to soften and extend the rubber. Typically, aromatic processing oils, having a certain content of polycyclic aromatic (PCA) compounds or polyaromatic hydrocarbons (PAH), have been used.

For example, such extender oils may be used to reduce the Mooney viscosity of synthetic rubber to ease their compounding with other ingredients of rubber mixtures. Additionally, these extender or process oils may be used in the tire industry as processing aids to ease compounding of the rubber and as a plasticizer to modify the mechanical properties of the rubber compound after vulcanization. These extender oils may also be used to influence the visco-elastic properties of a tire compound. The aromatic content of the extender oil may enhance wet grip properties. The nature of the oils used in extending synthetic rubber and processing rubber compounds is the same.

Mineral oils are classified by their type: Aromatic, Naphthenic and Paraffinic. Most commonly used are distillate aromatic extract (DAE) oils that are processing oils with a high polycyclic aromatic hydrocarbon (PAH) content. These DAE oils are considered to have a negative impact on the environment and human health because of the PAH content. Recently, regulatory, environmental and social concerns have necessitated the use of processing oils having a lower PAH content. As a result, there is a desire for the rubber and tire industry to cease the use of process oils that contain more than 3% PAH. It has been estimated that the tire industry will face major challenges, as switching from DAE will require about a million metric tons of DAE to be replaced per year.

To replace these oils the tire industry has started to use Treated Distillate Aromatic Extract (TDAE) and Mild Extract Solvate (MES) oils. Both of these oils provide tires that have better rolling resistance but, unfortunately, worse wet grip properties. Residual Aromatic Extract (RAE-) oils are offered as another possible replacement, and these oils provide better wet grip properties than the other oils with at least as good rolling resistance properties.

However, in changing to the use of the lower PAH content oils some loss in rubber compound performance has been noted. In order to provide such low PAH content oils, it is therefore necessary to develop new rubber compounds that provide desirable performance levels while incorporating the use of low PAH oils.

The most commercially desirable replacement oils that meet this specification will generally provide tires with lower wet grip. Most of the new oils are still based on non renewable mineral oils.

U.S. Pat. No. 2,483,797, issued Oct. 4, 1949, to Edward A. Van Valkenburgh, discloses tall oil acid composition. This invention relates to improvements in tall oil compositions for use in the compounding and vulcanization of rubber.

U.S. Pat. No. 2,578,955, issued Dec. 18, 1951, to Edward A. Van Valkenburgh, discloses composition of tall oil and aromatic oil and method of making it. This invention relates to compositions for use in the compounding and vulcanization of rubber, and particularly of synthetic rubber, and to method of producing such compositions.

U.S. Pat. No. 2,657,147, issued Oct. 27, 1953, to Edward A. Van Valkenburgh, discloses composition for vulcanizing rubber. The invention relates to improvements in tall oil acid compositions useful in the compounding and vulcanization of rubber.

U.S. Pat. No. 2,843,643, issued Jul. 15, 1958, to Gleim, discloses rubber containing demethylated wood tar distillate, and a method of preventing the cracking of rubber due to attack by ozone.

U.S. Pat. No. 3,157,609, issued Nov. 17, 1964, to McNay et al., discloses treatment of synthetic rubber. More particularly, it relates to a method of improving the processing characteristics of synthetic rubber-like polymers and the products obtained thereby.

U.S. Pat. No. 3,632,855, issued Jan. 4, 1972, to Halbrook, et al., discloses rosin-fatty olefin epoxide reaction products, formed by the reaction of one mole of rosin acid with one mole of a fatty olefin epoxide to give a hydroxy ester, useful as a tackifier in styrene-butadiene rubber (SBR).

U.S. Pat. No. 3,474,059, issued Oct. 21, 1969 to Body, discloses tackifier compositions for elastomeric olefin polymers for use in providing tack in rubbery copolymers of ethylene and another copolymerizable monomer selected from a-mono-olefins such as propylene (rubbery copolymers of ethylene and propylene being sometimes referred to in the art as "EPR") and in sulfur vulcanizable unsaturated rubber-like interpolymers of ethylene, at least one other copolymerizable monomer selected from a-mono-olefins, and at least one non-conjugated hydrocarbon diene; and to the rubbery compositions comprised of the novel tackifier composition and at least on of the above-described rubber-like copolymers and interpolymers.

U.S. Pat. No. 3,649,580, issued Mar. 14, 1972, to Arlt, Jr., et al., discloses tall oil pitch tackifiers in ethylene-propylene terpolymer rubber, containing at least 75% and preferably 80% to 100% of nonvolatile material is incorporated into ethylene-propylene terpolymer rubber, preferably as a 40% to 90% solution in rubber processing oil.

U.S. Pat. No. 3,873,482, issued Mar. 25, 1975 to Severson et al, discloses a process by which commercial tall oil materials, a mixture of fatty acids and resin acids, are pyrolyzed in a hot tube to yield products which when added to a synthetic rubber composition improve its tack.

U.S. Pat. No. 4,272,419, issued Jun. 9, 1981, to Force, discloses treatment of styrene-butadiene rubber. The adhesion and tack properties of styrene-butadiene rubber (SBR) are improved by replacing from 1% to 25% of the rubber with saponified tall oil pitch, based on the dry weight of the SBR. The SBR may be carboxylated or uncarboxylated, filled or unfilled.

U.S. Pat. No. 4,581,400, issued Apr. 8, 1986, to Kondo, discloses rubber compositions modified with blends of rosin material. A rubber composition comprising (a) 100 parts by weight of a rubber selected from the group consisting of natural rubber and synthetic diene rubbers and (b) about 1 to about 30 parts by weight of a rosin derivative comprising a blend of (i) about 15 to about 50% by weight of a rosin, (ii) about 10 to about 70% by weight of a polymerized rosin and (iii) not more than about 55% by weight of a rosin pitch, each based on the weight of the rosin derivative.

U.S. Pat. No. 5,504,135, issued Apr. 2, 1996, to Ardrizzi, et al., discloses an oil composition which has a kinematic viscosity at 100 C of from 32 to 50 cSt and which contains less than 3 weight percent polynuclear aromatic compounds that is employed as a process oil for rubber compounds, especially aromatic rubbers.

U.S. Pat. No. 6,103,808, issued Aug. 15, 2000, to Hashimoto, discloses a high aromatic oil and rubber composition and oil extended synthetic rubber using the same.

U.S. Patent Publication No. 2001/0023307, published Sep. 20, 2001, to Kaimai et al., discloses a rubber process oil in which the content of polycyclic aromatics (PCAs) as determined by the IP 346 method is less than 3% by mass and which is rich in aromatic hydrocarbons, and a method for producing the same U.S. Patent Publication No. 2002/0045697, published Apr. 18, 2002, to Sohnen et al., discloses a sulfur vulcanizable rubber composition which does not contain aromatic process oils including at least one diene elastomer, at least finely dispersed, precipitated silica and carbon as fillers, softeners, at least one silane coupling agent, and additional common additives as well as a process for their production.

U.S. Patent Publication No. 2002/0000280, published Jan. 3, 2002, to Scholl, discloses rubber mixtures for producing highly reinforced vulcanizates with low damping behaviour. The rubber mixtures consist of a rubber, a filler and a specific sulphurized mineral oil and are suitable for producing shaped vulcanizates, in particular for producing tires with reduced rolling resistance and high resistance to wet skidding, and tires with particularly reinforced side walls ("run flat tires").

U.S. Pat. No. 6,399,697, issued Jun. 4, 2002, to Takasaki, et al., discloses a process oil which satisfies requirements that a content of a polycyclic aromatic compound is less than 3% by weight, a content of an aromatic hydrocarbon is 18% by weight or more, a content of a polar compound is between 11 and 25% by weight, a kinematic viscosity at 100 C is between 10 and 70 mm$^2$/s, and a flash point is 210 C or more.

U.S. Pat. No. 6,984,687, issued Jan. 10, 2006, to Henning, et al., discloses an oil extended rubber and composition containing low PCA oil.

U.S. Pat. No. 7,193,004, issued Mar. 20, 2007, to Weydert, et al., discloses a pneumatic tire having a component containing low PCA oil U.S. Patent No. 2007/0082991, issued Apr. 12, 2007, to Chassagnon, et al., discloses tread for pneumatic tires. The invention relates to a tread for pneumatic tires with an improved capacity for adhesion to wet ground. Said tread consists of a rubber composition containing at least: (i) one dienic elastomer comprising more than 30 parts of rubber butyl, (ii) a reinforcing inorganic load such as silica, (iii) a coupling agent for the inorganic load, and, as a plasiticising agent, (iv) a glycerol unsaturated fatty acid triester (C12-C22), especially a glycerol trioleate.

However, in spite of the above advancements, there exists a need in the art for tire materials, tire compositions, tire components tires comprising such components and compositions, and methods of making and using such materials, compositions and tires.

There is a need in the art for a process oil that is not reliant on fossil based fuels and also provides the same level of performance as current process oils.

These and other needs in the art will become apparent to those of skill in the art upon review of this specification, including its drawings and claims.

SUMMARY OF THE INVENTION

We have invented a tire rubber composition comprising a rubber compound and a processing oil, wherein the processing oil comprises a modified tall oil pitch. The processing oil comprising modified pitch reduces or eliminates the need for processing oils derived from fossil fuels.

Tire components can be made by a method comprising fabricating the tire or a tire component from a tire rubber composition comprising a rubber compound and a processing oil, wherein the processing oil comprises a modified tall oil pitch. Therefore, an aspect of this invention even provides pneumatic tires wherein at least a portion of the tire comprises a rubber compound and a processing oil, wherein the processing oil comprises a modified tall oil pitch.

BRIEF DESCRIPTION OF THE SEVERAL VIEWS OF THE DRAWINGS

FIG. 1 is a graph of Tan Delta versus temperature for Lubrirob Sunflower oil, Flavex 595 RAE oil, Vivatec 200 MES oil, Tudalene 65 DAE oil, Vivatec 500 TDAE oil, and Norman 346 TDAE oil.

FIG. 2 is graph of Tan Delta versus temperature for Pitch Plant B, Pitch Plant A, Tudalene 65 DAE oil, and Vivatec 500 TDAE oil.

FIG. 3 is a graph of Tan Delta versus temperature for Norman 346 TDAE Oil, Pitch Plant C, Pitch Mod. 3 (Plant C), Pitch Mod. 2 (Plant C), and Tudalen 65 DAE Oil, FIG. 4 is a graph of Tan Delta versus temperature for Norman 346 TDAE Oil, Tudalen 65 DAE Oil, Pitch Plant B, and Mod. 1 (Plant B).

FIG. 5 is a graph of Tan Delta versus temperature for Norman 346 TDAE Oil, Tudalen 65 DAE Oil, Pitch Plant D, Mod 5 (Plant D), and Mod. 4 (Plant D).

DETAILED DESCRIPTION OF THE INVENTION

Some aspects described are related to the use of tall oil pitch as a sustainable alternative to mineral oil in any application. Other embodiments of the present invention relate to use of modified pitch to improve the performance characteristics of a tire compound. Still other embodiments of the present invention relate to use of blends of tall oil pitch and mineral oil to increase the sustainability factor of the tire.

Tall oil pitch is a venerable material of commerce, and is accordingly well known in the art. It is described in, e.g., Kirk Othmer Encyclopedia of Chemical Technology, H. Mark, J. McKetter and D. Othmer, Eds., Vol. 19, pp. 614-619 (2.sup.nd ed. 1969) and Smith, K. T. "Vinsol Resin and Tall Oil Pitch," Naval Stores, Chapter 21, Pulp Chemicals Association (1989), pp. 729-737 Tall oil pitch was analyzed and thoroughly described in Era et al. J. Amer. Oil Chem. Soc., Vol. 56, pp. 992-994 (1979) and Holmbom et al., J. Amer. Oil Chem. Soc., Vol. 55, pp. 342-344 (1978). Tall oil pitch is available from Arizona Chemical Company, Jacksonville, Fla., as well as many other suppliers. The inventors believe that any available tall oil pitch will be suitable for use in the present invention.

The precise composition of a tall oil pitch will depend, in part, on the process by which it was isolated. See, e.g., U.S. Pat. Nos. 5,164,480; 5,132,399; 4,553,433; 4,524,024; 4,495,095; 4,308,200; 4,238,304; 4,154,725; 4,075,188; and 3,943,117 for various processes that provide tall oil pitch. Typically, tall oil pitch is formed upon fractionation of crude tall oil (CTO), where CTO is a composition that is obtained as a result of practicing the sulfate wood pulping process. Upon heating, CTO yields volatile materials that primarily consist of tall oil heads, tall oil rosin and tall oil fatty acids. The residue from this distillation process is tall oil pitch. Tall oil pitch typically contains approximately 2 to 8% fatty acids, 5 to 15 rosin acids and 30 to 45% of a material commonly referred to as "unsaponifiables," where these percentages are on a weight basis. Within the pitch, there are fatty and resin acids bound to sterols through ester functions, as well as some free acids. Rosin dimers and fatty acid dimers are also often found in tall oil pitch. Typical acid numbers of tall oil pitch are in the range from 15 to 50.

As non-limiting examples, commercially available tall oil pitch may contain in the range of 34.6-51.6% free acids, 23.2-37.8% esterified acids, and 25.3-34.4% unsaponifiable neutral compounds. As a further non-limiting example, approximately 60% of the weight fraction of tall oil pitch may consist of high molecular components of which about half may be acidic compounds. The remaining low molecular free acids may be mostly dehydroabietic, abietic, and other resin acids. The esterified acids may consist chiefly of oleic and linoleic acids. As a further non-limiting examples, unsaponifiable fractions may be composed of diterpene alcohols, fatty alcohols, sterols, and dehydrated sterols. The alcohol components may be almost completely esterified.

Tall oil pitch has been tested, as is, in rubber compound as a replacement of fossil based process oils in tire formulation. However, the performance of the rubber compound based on unmodified is not suitable for some, tire formulations. We have discovered chemical modifications to tall oil pitch, that provide a modified tall oil pitch. This tall oil pitch can then be compounded in tire rubber compounds to give performance equivalent to tire rubber compounds containing petrochemical extender oils. Examples of chemical modifications to tall oil pitch include esterification, thermal treatment with esterification catalysts, and decarboxylation. In some embodiments, both decarboxylation and esterification are used to provide a modified tall oil pitch with desired performance. Non-limiting examples of a suitable modified tall oil pitch include pitch esters of 2-Ethylhexyl alcohol, sorbitol and ethylene glycol.

In an aspect of our invention, a tall oil pitch is reacted with an alcohol to make a pitch ester. Non-limiting examples of alcohols suitable for use in the present invention include, alcohols which may be linear, branched, or cyclic, and which may contain 1, 2, 3, 4, 5, 6, 7, 8, 9, 10, 12, 14, 16, 18, 20, 25, or 30 carbons, or carbons in any range from/to or between any two of the foregoing numbers, as non-limiting examples, 1-30 or 6-18 carbon atoms. Non-limiting examples of suitable mono-alcohols are methanol, ethanol, 2-ethyl-hexanol, propanol, butanol, and pentanol. Non-limiting examples of suitable polyhydric alcohols include glycerin, ethylene glycol, diethylene glycol, triethylene glycol, polyethylene glycol, polypropylene glycol, erythritol, xylitol, mannitol, sorbitol and volemitol. These embodiments provide replacement of part of or all of the current mineral oil with equivalent amount of pitch ester in rubber compound formulation. Non-limiting examples of a suitable modified pitch include pitch alcohol esters, such as pitch mono-alcohol esters or pitch polyhydric alcohol esters. More non-limiting examples include pitch glycerin ester, pitch ethylene glycol ester, pitch erythritol ester, pitch pentaerythritol ester, pitch xylitol ester, pitch mannitol ester, pitch sorbitol ester, or pitch volemitol ester.

In some aspects of the invention, the tall oil pitch acts as an extender for the tire rubber. In this respect, it is desirable to have an extender material having an acid value less than 60, 55, 50, 45, 40, 35, 30, 25, 20, 15, 10, 5, 3, or 1, or an acid value in any range from/to or between any two of the foregoing numbers.

In some aspects, a short mono-functional alcohol may be used to reduce the viscosity of the tall oil pitch. Other embodiments utilize a blend of mono-functional and multifunctional alcohols reacted at different temperatures to allow the viscosity of the pitch to remain low while improving the performance of the pitch. Still other embodiments utilize a heat treatment of pitch, with or without a catalyst, to react the residual OH function with residual acid functions of the pitch. Other methods include steps to decarboxylate the pitch to reduce its acid number.

The tire rubber composition may include 1, 5, 10, 15, 20, 25, 30, 35, 40, 45, 50, 55, 60, 65, 70, 75 parts of modified pitch as a processing oil (based on 100 parts of rubber compound), or in any range from/to or between any two of the foregoing numbers. For example, the tire rubber could contain from 1 to 5 parts per hundred of modified pitch, 25 to 30 parts per hundred modified pitch, or 45 to 50 parts per hundred of modified pitch.

The processing oil used may include both extending oil present in the elastomers, and process oil added during compounding. That is, the modified pitch may be added in an amount to extend the rubber composition. Modified pitch as processing oil may also be added during rubber compounding, for example in a mixer or mill.

While certain embodiments utilize processing oil that is 100% modified pitch, other embodiments contemplate a mixture of modified pitch with other known processing oils. Suitable other known processing oils include various oils as are known in the art, including aromatic, paraffinic, naphthenic, vegetable oils (other than castor oil), and low polyaromatic hydrocarbon (PAH) oils, such as methylated seed (MES), treated distillate aromatic extract (TDAE), SRAE and heavy naphthenic oils. Suitable low PAH oils include those having a polycyclic aromatic content of less than 3 percent by weight.

For those embodiments that utilize a processing oil mixture of modified pitch with other processing oils, the modified pitch will comprise at least 1, 5, 10, 20, 30, 40, 50, 60, 70, 80, 90, 95 or 99 weight percent of the processing oil mixture, or any range from/to or between any two of the foregoing numbers.

The tire rubber compositions will comprise a rubber polymer compound. It should be understood that the tire rubber composition, may include any suitable rubber polymer or combinations of rubber polymers as the rubber polymer compound. The type of rubber polymer selected as the rubber polymer compound may include natural rubber and its various raw and reclaimed forms as well as various synthetic rubber polymers, and any combinations thereof, depending upon the desired end use.

Representative synthetic rubber polymers are the homopolymerization products of butadiene and its homologues and derivatives, for example, methylbutadiene, dimethylbutadiene and pentadiene, as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. It should be understood that any of the rubbers may be end-modified. Such an end-modifying group may be a carboxyl group, an amino group, a hydroxyl group, an alkoxyl group or a silanol group (—SiOH), for example. Meanwhile, a rubber may contain a modifying group inside the rubber chain. Such a modifying group may be an epoxy group or a ketone group, for example. Any of these rubbers can be used either in a single form or an arbitrarily blended form.

The tire rubber composition of the present invention may also utilize any suitable additives and fillers as may be desired. Thus, it is possible to blend various additives generally used in tire rubber compositions, including, vulcanizing agents, vulcanization accelerators, antioxidants, plasticizers, coupling agents, reinforcing agents, viscosifiers, colorants, softeners, fillers, and the like with the tire rubber composition of the present invention. Such an additive can be kneaded with the rubber composition by a general method, thereby being used for a curing or crosslinking process. Blending amounts of these additives may be set to conventional and general blending amounts so far as the usages thereof do not contradict with the object of the present invention. The tire rubber composition of the present invention can be manufactured by mixing the above-mentioned components by using publicly-known rubber kneading machines including Banbury mixers, kneaders, and roll mills, for example.

EXAMPLES

Pitches and the modified pitches are characterized by their acid value AV determined according to ASTM D1980-87 and expressed in mgKOH/g. and their kinematic viscosity KV, measured at a temperature of 100° C. according to ASTM D445-11 and expressed in cSt. The flash points of the pitch esters are determined according to ASTM D93-10.

All the process oils of petrochemical origin, the various tall oil pitches and the modified tall oil pitches are evaluated in a typical S-SBR/BR 70/30 Silica tread compound. Its formulation is provided in table 1. The compounding and vulcanization protocol is provided in table 2.

TABLE 1

Silica tread compound formulation and point of addition, oil* refers to either mineral process oils or tall oil pitches and modified tall oil pitches according to the invention.

| | Total recipe (phr) | First Stage (phr) | Second stage (phr) | Final (phr) |
|---|---|---|---|---|
| Buna VSL 5025-0HM | 70.0 | 70.0 | | |
| Buna CB 24 | 30.0 | 30.0 | | |
| Ultrasil 7000GR | 80.0 | 80.0 | | |
| Statex N 234 | 10.0 | 10.0 | | |
| Silan Si69 | 8.0 | 8.0 | | |
| Oil* | 20.0 | 20.0 | | |
| Vulkanox 4010 (IPPD) | 1.0 | | | |
| Vulkanox 4020 (6PPD) | 2.0 | | | |
| Vulkanox HS (TMQ) | 0.5 | | | |
| Antilux 654 | 1.0 | | | |
| Zinc oxide RS | 3.0 | 3.0 | | |
| Stearic acid | 1.0 | 1.0 | | |
| Sulphur | 1.5 | | | 1.5 |

TABLE 1-continued

Silica tread compound formulation and point of addition, oil* refers to either mineral process oils or tall oil pitches and modified tall oil pitches according to the invention.

| | Total recipe (phr) | First Stage (phr) | Second stage (phr) | Final (phr) |
|---|---|---|---|---|
| Vulkacit CZ (CBS) | 1.5 | | | 1.5 |
| Vulkacit D (DPG) | 2.0 | | | 2.0 |

Mixing Process

The compounds have been manufactured with a three stage mixing process as follows:
Mixer: Haake Rheomix 3000 p (all stages)
Start temperature: 60° C. (first and second stage), 30° C. (third stage)
Rotor speed: 60 rpm (first stage), 70-50 rpm (second stage) in order avoid to high temperature), 30 rpm (third stage)

TABLE 2

Sequence of raw material addition and mixing times

| Mixing stage | Time (min/sec) | Components according to table 1 |
|---|---|---|
| 1 | 0'00" to 2'00" | Polymers |
| | 2'00" to 6'00" | 50 phr Silica, 5 phr Si69, carbon black, ZnO, stearic acid |
| | 6'00" to 10'00" Ram lift at 9 minutes | 30 phr Silica, 3 phr Si69, Oil, Antioxidants, Wax |
| 2 (after 24 hours) | 0'00" to 6'00" Ram lift at 2 and 4 minutes | Batch from stage 1 |
| 3 (after 24 hours) | 0'00" to 1'00" 1'00" to 4'00" | Batch from stage 2 Sulphur, accelerators |

The compounds were formed into 2 mm test plates and cured at 160° C. according to their respective T90 values plus 1 minute per mm of test plate thickness, The physical properties were tested as follows:
Mooney refers to Mooney viscosity MS(1+4) at 100° C. according to DIN 53523.
Min Torque, Max Torque, T90 refers to curing behavior, rheometer measurements according to DIN 53529 at 160° C.
Hardness refers to Hardness Shore A according to DIN 53505.
Tensile, Elongation, M100, M200, M300 refers to tensile properties (tensile strength at, elongation at break, modulus M100 at 100%, M200 at 200% and M300 at 300% elongation) according to DIN 53504.

The viscoelastic properties (DMA) have been detected by means of a Rheometrics Dynamic Analyzer (RDA II). Modulus and tan ô were measured as a function of the temperature between −100 and +150° C. at a frequency of 1 Hz and an amplitude of 0.5%.

Example 1

A comparison is made between certain materials identified as possible extender materials and known extender materials. To be useful as extender materials in tires, these pitches must provide desired cure or physical properties for the compound as well as being at least as good dynamically as known materials, or at least as good dynamically to be useful in tire manufacture.

DAE oil (Tudalen 65, supplied by Hansen & Rosenthal) is used as the standard oil and all the others are compared against it. TDAE (Vicatec 500, supplied by Hansen& Rosental), MES (Vicatec 200, supplied by Hansen& Rosenthal), RAE (Flavex 595, supplied by Shell) and the Lubrirob TOD 18.80 (refined high oleic sunflower oil, available from Novance) oils were selected for comparison. Tudalen and Vivatec are registered trademarks of Hansen& Rosenthal, Germany, Flavex is a registered trademark of Shell, UK/The Netherlands.

The materials of the invention are made from various liquid pitch and other tall oil distillates Pitch from plants designated A, B, C and D, are compared to results from Sylvablend FA7002 a tall oil, available from Arizona Chemical, B.V. and Sylvatal D40 LR distilled tall oil, available from Arizona Chemical.Sylvatal and Sylvablend are trademarks of Arizona Chemical, USA. Useful tall oil pitch include materials derived from CTO fractionation to separate tall oil fatty acid alone or in conjunction with tall oil rosin, as well as from fractionation of pre-processed CTO from which phytosterols are extracted.

Specifically, Sylvatal D40 LR can be described as a source of tall oil fatty acid having a high tall oil rosins content. The utility of distilled tall oil fatty acid can be found in the long carbon chain (C18), acid function of the carboxyl group (—COOH), or unsaturation of the double bonds, and the bulky, Abietan related structures of resin acid molecules.

Specifically, Sylvablend FA7002 can be described as non-titering, fatty acid product containing approximately 75% dimer, trimer, and higher molecular-weight acids derived from the partial thermal polymerization of those unsaturated C18 and C20 fatty acids normally found in tall oil. FA7002 provides the combination of difunctionality, long hydrocarbon chain, and low cost.

TABLE 3

Physical Property Summary of compounds containing commercial oils and pitch from Plant A and Plant B, respectfully as well as a Fatty acid FA7002 and a Distilled Tall oil D40 LR, normalized to the reference DAE oil.

|  | DAE Tudalene 65 | RAE Flavex 595P | TDAE Vivatec 500 | MES Vivatec 200 | Lubrirob TOD 1880 | Pitch Plant A | Pitch Plant B | FA7002 | D40 LR |
|---|---|---|---|---|---|---|---|---|---|
| Mooney | 100 | 99 | 91 | 98 | 100 | 91 | 78 | 72 | 94 |
| Min Torque | 100 | 92 | 84 | 88 | 86 | 99 | 96 | 89 | 105 |
| Max torque | 100 | 98 | 104 | 102 | 115 | 88 | 85 | 87 | 89 |
| T90 | 100 | 95 | 91 | 91 | 88 | 100 | 104 | 140 | 147 |
| Hardness | 100 | 96 | 101 | 100 | 102 | 96 | 97 | 99 | 98 |
| Tensile | 100 | 107 | 103 | 91 | 101 | 118 | 118 | 115 | 112 |
| Elongation | 100 | 115 | 98 | 92 | 116 | 145 | 132 | 152 | 156 |
| M100 | 100 | 92 | 106 | 104 | 90 | 71 | 82 | 80 | 79 |
| M200 | 100 | 88 | 107 | 101 | 84 | 72 | 84 | 77 | 73 |
| M300 | 100 | 94 |  |  | 89 | 79 | 89 | 79 | 74 |

From Table 3 it can be seen that changing the oil from a DAE type generally reduces the modulus of the compound. It is generally accepted in tire rubber art that lower modulus rubber is regarded in tire art as affecting ride and handling of the tire in opposing directions. Low modulus improves ride quality, making it smoother, while reducing the cornering response.

The RAE, TDAE and MES oils have a lower impact on the properties of tire rubber, compared with the identified potential substitutes, i.e., Pitch, FA7002 and D40 LR. materials. The pitch of plant B has the least effect of these potential substitute materials but the modulus is lower than any of the standard oils although the modulus at 200% elongation (M200) and at 300% elongation (M300) are similar to RAE and Lubrirob oils which are both being promoted for tires.

FA7002 and D40 LR are much quicker curing (this is not necessarily good for production as more control is required to ensure that the material does not cure up before it is required to causing scrap material). Also the moduli of these materials are very low.

TABLE 4

DMA Tan Delta summary, normalized values to reference DAE oil

| Temp (° C.) | DAE | RAE | TDAE | MES | Lubrirob | Pitch Plant A | Pitch Plant B | FA7002 | D40 LR |  |
|---|---|---|---|---|---|---|---|---|---|---|
| 0 | 100 | 97 | 96 | 91 | 84 | 78 | 101 | 80 | 84 | higher better |
| 20 | 100 | 91 | 94 | 92 | 84 | 77 | 90 | 86 | 85 | higher better |

TABLE 4-continued

DMA Tan Delta summary, normalized values to reference DAE oil

| Temp (° C.) | DAE | RAE | TDAE | MES | Lubrirob | Pitch Plant A | Pitch Plant B | FA7002 | D40 LR | |
|---|---|---|---|---|---|---|---|---|---|---|
| 40 | 100 | 88 | 94 | 92 | 88 | 78 | 89 | 104 | 99 | higher better |
| 70 | 100 | 84 | 97 | 91 | 95 | 88 | 95 | 123 | 110 | lower better |

From Tables 3 and 4, the pitch from plant B is most comparable to a commercial mineral process oil.

FA7002 and D40LR would increase the rolling resistance considerable, and would be used with those types of tires where such a property is desired.

The FA 7002 sample has 17% rosin while the D40LR sample has 37% rosin. The FA 7002 sample produces the higher Tan Delta at 70° C.

Example 2

Tudalene 65 DAE oil from H&R was taken as the existing standard oil and all the others were compared against it as an example of the preferred tire industry mineral oil.

Norman 346 TDAE oil, supplied by Orgkhim was selected to understand the effect of this oil on the dynamic properties of tires.

The Vivatec 500 (TDAE), supplied by H&R, is an oil that has been used for the last 4 years in tires and is considered a standard oil to replace DAE. Although it does give reduced wet grip it improves rolling resistance.

RAE is new category of oil that is known in the prior art to provide tire properties as the DAE oils but it does have high viscosity. The one used in this example was Flavex 595 from Shell.

The Vivatec 200 MES oil is from H&R and is discussed in the prior art as a tire component with polyterpenes. The MES oils like the TDAE oils generally give reduced wet grip but improved rolling resistance.

The Lubrirob TOD 1880 is a sunflower oil supplied by Novance, which is named also mentioned in the prior art as a tire component for improved wet grip in tires in conjunction with polyterpenes.

The other samples were pitches where the acid number had been reduced to ascertain if this was the source of the reduction in modulus and max torque seen in Example 1.

There were two methods used to modify the pitch.

The first method was the addition of magnesium acetate or glycerol or a combination of both to the pitch to try to esterify the residual acid groups.

The second method was to react the pitch with calcium to form a soap.

Wet grip and rolling resistance are known in the art to be predicted to a large extent by Dynamic Mechanical Analysis (DMA). This is because both wet grip and rolling resistance are related to hysteresis losses within the compound.

For a passenger tire under normal running conditions the tread temperature is between 50-70° C. and the angular frequency of rotation is approximately 10 Hz. For good rolling resistance under these conditions the hysteresis loss should be at a minimum.

Wet grip is a high frequency ($10^4$ Hz) and low temperature (0 to 40° C.) effect. For good wet braking a high hysteresis loss under these conditions is required.

Using a temperature sweep the Tan Delta (Loss Modulas/Elastic Modulas) at between 0 to 40° C. is accepted by the industry to relate to wet grip, the higher the Tan Delta the better the wet grip. The area between 50-70° C. is accepted as relating to rolling resistance, here the lower the Tan Delta the better the rolling resistance.

TABLE 5

Physical Property Summary of Compounds containing Commercial Oils, normalized to reference DAE oil

| | DAE Tudalene 65 | RAE Flavex 595 | TDAE Norman 346 | TDAE Vivatec 500 | MES Vivatec 200 | Lubrirob TOD 1880 |
|---|---|---|---|---|---|---|
| Kinematic Viscosity at 100° C. (cSt) | 100 | −57 | 122 | 125 | 133 | 167 |
| Mooney | 100 | 99 | 103 | 91 | 98 | 100 |
| Min Torque | 100 | 92 | 99 | 84 | 88 | 86 |
| Max torque | 100 | 98 | 103 | 104 | 102 | 115 |
| T90 | 100 | 95 | 95 | 91 | 91 | 88 |
| Hardness | 100 | 96 | 99 | 101 | 100 | 102 |
| Tensile | 100 | 107 | 93 | 103 | 91 | 101 |
| Elongation | 100 | 115 | 102 | 98 | 92 | 116 |
| M100 | 100 | 92 | 96 | 106 | 104 | 90 |
| M200 | 100 | 88 | 90 | 107 | 101 | 84 |
| M300 | 100 | 94 | 90 | N/A | N/A | 89 |

Referring now to FIG. 1, a graph labeled "Tan Delta of compounds containing Commercial Oil Samples", data generated at the same time is compared directly. In the FIG. 1, the Norman 346 and the Tudalene 65 repeat can be compared together and the others can be compared separately. The DAE is expected to have the best wet grip and the RAE the best rolling resistance.

In run two the Norman 346 oil has better wet grip than the DAE oil and similar rolling resistance.

TABLE 6

Physical Properties Summary of Pitches of different plants and different pitch modifications, normalized to reference DAE oil.

| | DAE | Pitch PN Plant A March 2009 | Pitch PN Plant B March 2009 | Pitch Plant B April 2009 | Pitch Modification 1 Mg acetate | Pitch Plant C April 2009 | Pitch Modification 2 Glycerol | Pitch Modification 3 Mg acetate + Glycerol | Pitch Plant D | Pitch Modification 4 Calcium 7.25% | Pitch Modification 5 Calcium 3.6% |
|---|---|---|---|---|---|---|---|---|---|---|---|
| Kinematic Viscosity at 100° C. (cSt) | 100 | −113 | −151 | 12 | −40 | −273 | −360 | −426 | −34 | N/A | N/A |
| Mooney | 100 | 91 | 78 | 98 | 93 | 82 | 88 | 81 | 101 | 77 | 84 |
| Min Torque | 100 | 99 | 96 | 112 | 111 | 98 | 98 | 100 | 120 | 97 | 107 |
| Max torque | 100 | 88 | 85 | 87 | 88 | 92 | 103 | 101 | 91 | 97 | 86 |
| T90 | 100 | 100 | 104 | 109 | 120 | 56 | 82 | 76 | 123 | 45 | 92 |
| Hardness | 100 | 96 | 97 | 97 | 99 | 98 | 101 | 100 | 104 | 104 | 101 |
| Tensile | 100 | 118 | 118 | 99 | 98 | 102 | 100 | 100 | 90 | 100 | 96 |
| Elongation | 100 | 145 | 132 | 124 | 118 | 111 | 104 | 101 | 135 | 93 | 120 |
| M100 | 100 | 71 | 82 | 83 | 89 | 91 | 102 | 100 | 83 | 117 | 83 |
| M200 | 100 | 72 | 84 | 76 | 83 | 91 | 97 | 98 | 71 | 115 | 78 |
| M300 | 100 | 79 | 89 | 78 | 83 | 92 | 96 | 98 | 69 | N/A | 80 |

In Table 6, Modification 1 is pitch to which 0.4% magnesium acetate was added. The mixture was heated to 280° C. for 3 hours. This reduced the acid value from 54 to 26.

Modification 2 is pitch to which 3.6% glycerol was added and the mixture was heated to 295° C. to esterify the pitch. This was successful as the acid value was reduced from 39.8 to 22 in 3 hours 15 minutes.

Modification 3 is pitch to which 0.4% magnesium acetate and 4% glycerol was added. This was heated to 295° C. for 4 hours. In one hour the acid value dropped from 40 to 21. The final effect was that the acid value was only reduced by 5 points but this could be increased with a shorter cycle time.

Modification 4 and modification 5 are soaps of Pitch from plant D with 7.25% and 3.6% calcium hydroxide, respectfully.

From the Table 6 summary the pitch of plant C has the closest physical properties to DAE and the kinematic viscosity is very high, meaning that it may have application is some types of tires in which such viscosity is desirable.

The addition of magnesium acetate to pitch of Plant B reduces the acid value and slightly improves the modulus of the compound.

The addition of glycerol or glycerol and magnesium acetate to pitch of plant C improves the cure rate and cross link density of the compound. This means that the modulus is improved. While it is useful in some tire applications, ideally further improvement to modulus would allow its use in even more tire applications. While the Mooney number is a little high, it may still find application in some tire applications.

Referring now to FIG. 2, a graph entitled, "Tan Delta For Pitch Samples 1$^{st}$ Run", the DAE oil was the best for wet braking and the pitch of plant A was the worst. The Vivatec 500 and the pitch of plant B were similar for wet braking. The Vivatec 500 was better for Rolling Resistance.

Referring now to FIG. 3, a graph entitled, "Tan Delta of Compounds containing Pitch and Modified Pitch, compared to Mineral Oil", the Norman 346 had better wet grip and similar rolling resistance to the DAE oil. The Pitch of Plant C had similar wet braking and rolling resistance to the DAE oil.

Referring now to FIG. 4, a graph entitled, "Tan Delta of Compounds containing Pitch of Plant B and its modification, compared to Mineral Oil", the rolling resistance of the pitch of plant B is slightly improved by the addition of magnesium acetate.

Referring now to FIG. 5, a graph entitled, "Tan Delta of Compounds containing Pitch of Plant D and its modifications, compared to Mineral Oils", Pitch of Plant D show poor wet grip and rolling resistance. The treatment with 7.25% calcium hydroxide significantly improves the wet grip and rolling resistance.

In this Example 2, Pitch of Plant C is the best starting material tested; however it does have a high viscosity. Rubber compounds made with this pitch also had high Mooney viscosity, poor cure rate as well as low modulus. The compound properties of such rubber compound are be improved by esterifing the pitch with either magnesium acetate or magnesium acetate and glycerol.

The Pitch of plant B generally gives better physical properties to the tested rubber compound than the pitch of plant C but the moduli and dynamic properties are poorer. The moduli and rolling resistance can be improved by its esterification The pitch of plant D has the sterols removed, has a high viscosity, low modulus rate and gives the compound very poor wet grip and rolling resistance. Making the pitch into a calcium soap improves the modulus of the compound but raises the cure rate. It also improves the dynamic properties but not to the levels of the pitch of plant C.

These results show that esterifing the pitch reduces the acid value, increases the compound moduli and improves the dynamic properties of the compound which means that the tire properties are improved compared to the unesterified pitch compounds.

Example 3

Pitches from plant A with an acid value AV of 45 and a kinematic viscosity $KV_{100}$ of 155 cSt, of plant C with AV 118 and $KV_{100}$ 61 of plant D with AV 33 and $KV_{100}$ 87 are modified by esterification with Ethylene Glycol. The selected pitch is charged into a 4-neck 5 l flask equipped with reflux condenser on top of a Dean-Stark separator, an inlet and outlet for gaseous Nitrogen and stirrer. The charge amounts of the reactants are displayed in Table 7. While stirring, the mixture is heated up to 200° C. at a rate of 30° C./hour. After reaching the temperature the heat rate was increase to 60° C./hour to reach a top temperature of 260° C. The mixture was maintained at this temperature until an acid value of below 20 mg/g KOH was determined. The reaction takes a total of approximately 9 hours. The reaction product is discharged and cooled. The characteristics of 3 different pitch esters of Ethylene glycol are listed in Table 7.

TABLE 7

Composition and physical properties of of Pitches of plant A, C, and D, modified with Ethylene glycol.

|  |  | Plant A Charge, g | Plant C Charge, g | Plant D Charge, g |
|---|---|---|---|---|
| Pitch Ester Formula |  |  |  |  |
| Tall Oil Pitch |  | 2821.0 | 3450.0 | 3387.0 |
| Ethylene Glycol |  | 51.4 | 87.7 | 221.4 |
| Total Charge |  | 2872.4 | 3537.7 | 3608.4 |
| Loss |  | 29.9 | 50.9 | 128.6 |
| Yield |  | 2842.5 | 3486.8 | 3479.8 |
| Physical Properties |  |  |  |  |
| AV | mgKOH/g | 14 | 15 | 16 |
| $KV_{100}$ | cSt | 97 | 142 | 89 |
| Flash Point (closed cup), | ° C. (° F.) | 193 (380) | 216 (420) | 213 (415) |

The esterified pitches were tested in a Silica tread rubber compound according the formula and procedures as described in Example 1. In addition to the test methods described in Example 1, Tear strength was measured according to ISO 34, resilience rebound according to ISO 4662 at 23° C. and 70° C., respectfully, and dynamic mechanical properties were determined on a Explenor, 100N, temperature sweep between −100° C. and +150° C. at 10 Hz with 5% static and 2% dynamic deformation according to ISO 4664. Normalised physical properties of the uncured and cured rubber compounds as well as dynamic mechanical properties are given in Table 8.

TABLE 8

Physical and dynamic mechanical properties of compounds containing tall oil pitch Ethylene glycol esters according table 7, normalized to a TDAE oil containing compound

|  | TDAE | Plant A | Plant C | Plant D |
|---|---|---|---|---|
| Physical Properties |  |  |  |  |
| Mooney | 100 | 93 | 96 | 97 |
| T90 | 100 | 88 | 84 | 85 |
| Hardness | 100 | 120 | 117 | 116 |
| Tensile | 100 | 120 | 117 | 116 |
| Elongation | 100 | 124 | 119 | 115 |
| M100 | 100 | 90 | 93 | 94 |
| M200 | 100 | 90 | 94 | 96 |
| M300 | 100 | 95 | 98 | 101 |
| Tear strength | 100 | 134 | 109 | 144 |
| Dynamic Mechanical properties |  |  |  |  |
| Rebound resilience at 23° C. | 100 | 110 | 114 | 109 |
| Rebound resilience at 70° C. | 100 | 91 | 87 | 88 |
| Tan delta at 0° C. | 100 | 100 | 92 | 93 |
| Tan delta 20° C. | 100 | 109 | 110 | 107 |
| Tan delta 60° C. | 100 | 79 | 75 | 78 |

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below.

The invention claimed is:

1. A tire rubber composition comprising a rubber compound and a processing oil, wherein the processing oil comprises a modified tall oil pitch present in an amount from 35 to 75 parts by weight, based on 100 parts by weight of rubber compound.

2. The composition of claim 1, wherein the modified tall oil pitch is selected from a group of modified pitches consisting of a pitch ester, a decarboxylated tall oil pitch, a soap of tall oil pitch, a thermally treated tall oil pitch, and a thermally and catalytically treated tall oil pitch.

3. A tire rubber composition comprising a rubber compound and a processing oil, wherein the processing oil comprises a modified tall oil pitch present in an amount from 35 to 75 parts by weight, based on 100 parts by weight of rubber compound, wherein the modified pitch being selected from a group of pitch esters consisting of pitch mono-alcohol esters and pitch polyhydric-alcohol esters.

4. The composition of claim 3, wherein the pitch polyhydric-alcohol ester is selected from a group consisting of pitch glycerin ester, pitch erythritol ester, pitch pentaerythritol ester, pitch xylitol ester, pitch mannitol ester, pitch sorbitol ester, and pitch volemitol ester.

5. The composition of claim 1 wherein the modified tall oil pitch comprises pitch 2-Ethylhexanol ester.

6. The composition of claim 1, wherein the modified pitch comprises pitch sorbitol ester.

7. A method of making a tire comprising fabricating one or more portions of the tire from the tire rubber composition of claim 1 and curing the tire rubber composition.

8. A pneumatic tire wherein at least a portion of the tire comprises the cured tire rubber composition of claim 1.

9. A tire rubber composition comprising a rubber compound and a processing oil, wherein the processing oil consists essentially of a modified tall oil pitch present in an amount from 55 to 75 parts by weight, based on 100 parts by weight of rubber compound.

10. A tire rubber composition comprising a rubber compound and a processing oil, wherein the processing oil comprises a modified tall oil pitch present in an amount from 55 to 75 parts by weight, based on 100 parts by weight of rubber compound.

11. A tire rubber composition comprising a rubber compound and a processing oil, wherein the processing oil is a pitch polyhydric-alcohol ester.

12. The tire rubber composition of claim 11 wherein the pitch polyhydric-alcohol ester is present in an amount from 35 to 75 parts by weight, based on 100 parts by weight of rubber compound.

* * * * *